(12) United States Patent
Gritti (10) Patent No.: US 8,570,011 B2
(45) Date of Patent: Oct. 29, 2013

(54) DC-DC CONVERTER CIRCUIT (75) Inventor: Giovanni Gritti, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 219 days.

(21) Appl. No.: 13/103,250

(22) Filed: May 9, 2011

(65) Prior Publication Data

US 2011/0285370 A1 Nov. 24, 2011

(30) Foreign Application Priority Data

May 7, 2010 (IT) .............................. MI2010A0824

(51) Int. Cl.
*G05F 1/40* (2006.01)
(52) U.S. Cl.
USPC ......................................... 323/282
(58) Field of Classification Search
USPC .................. 323/268, 270, 271, 273, 274, 282
See application file for complete search history.

(56) References Cited

U.S. PATENT DOCUMENTS

| | | | | |
|---|---|---|---|---|
| 6,229,289 B1* | 5/2001 | Piovaccari et al. | ............. | 323/268 |
| 6,366,070 B1* | 4/2002 | Cooke et al. | .................. | 323/284 |
| 6,424,132 B1* | 7/2002 | Wrathall | ...................... | 323/282 |
| 6,737,841 B2* | 5/2004 | Wrathall | ...................... | 323/282 |
| 6,972,974 B2* | 12/2005 | Inn et al. | ......................... | 363/89 |
| 7,095,220 B2* | 8/2006 | Kernahan | ..................... | 323/268 |
| 7,170,264 B1* | 1/2007 | Galinski | ....................... | 323/222 |
| 7,489,119 B2* | 2/2009 | Smith et al. | ................... | 323/283 |
| 7,492,132 B2* | 2/2009 | Kuroiwa et al. | ............... | 323/222 |
| 8,077,490 B1* | 12/2011 | Prodic et al. | .................... | 363/65 |
| 8,143,874 B2* | 3/2012 | Templeton | .................... | 323/283 |
| 8,217,637 B2* | 7/2012 | Tsui et al. | ...................... | 323/282 |
| 2008/0080218 A1 | 4/2008 | Holmquist et al. | | |
| 2008/0197826 A1 | 8/2008 | Schiff et al. | | |
| 2009/0206810 A1 | 8/2009 | Chellamuthu et al. | | |

FOREIGN PATENT DOCUMENTS

GB 2277614 11/1994

OTHER PUBLICATIONS

Search Report for Italian Application No. MI20100824, Ministero dello Sviluppo Economico, Munich, Dec. 21, 2010, pp. 2.

* cited by examiner

*Primary Examiner* — Adolf Berhane
(74) *Attorney, Agent, or Firm* — Graybeal Jackson LLP (57) ABSTRACT

An embodiment of a voltage conversion unit comprising a switching DC-DC converter including an input terminal for receiving an input voltage from a source, a control terminal adapted to receive a pulse width modulated driving signal oscillating at a first frequency, and an output terminal for providing to a load an output voltage generated from the input voltage according to the driving signal. The switching DC-DC converter and the switching control unit form a feedback loop having a loop gain defining a corresponding operating bandwidth. The load is configured to d rain a current pulse train having a second frequency; the values of the first and second frequencies are such to cause the occurrence of beat oscillations at frequencies comprised within the operating bandwidth. The switching control unit comprises means for reducing the beat oscillations by increasing the loop gain at least for a frequency interval comprised within the operating bandwidth.

35 Claims, 9 Drawing Sheets

DC-DC CONVERTER CIRCUIT

PRIORITY CLAIM

The instant application claims priority to Italian Patent Application No. MI2010A000824, filed May 7, 2010, which application is incorporated herein by reference in its entirety.

TECHNICAL FIELD

An embodiment relates the electronic field. Particularly, an embodiment concerns switching direct current-direct current (DC-DC) converters, and in greater detail concerns a compensation network for converters of such type.

BACKGROUND

In electronics, a DC-DC converter is an electronic circuit adapted to convert a direct current source from one voltage value to another voltage value.

One of the most relevant among the known types of DC-DC converters is represented by the switching DC-DC converters. Considering in particular a DC-DC converter of the "step-down" type, wherein the input voltage is converted into an output voltage having a lower value, an example of the operation thereof will be now described. During a first phase—denoted as "main phase"—the switching DC-DC converter electrically couples a source of the input voltage (to be converted) to a terminal of a reactive element, typically an inductor. As a consequence, in this phase the reactive element stores magnetic energy, absorbing an input current from the input voltage source. In this phase, the output load requiring the (converted) output voltage receives energy from the input voltage source. In a second phase—denoted "secondary phase"—the reactive element is disconnected from the input voltage source, and the output load receives the magnetic energy that has been stored in the reactive element during the main phase. Acting on the ratio between the main phase and secondary phase durations—denoted "duty cycle"—it is possible to regulate the transfer of energy from the voltage source to the output load in a controlled way, and thus bring the voltage provided to the output load to the requested value.

An important application field of the step down DC—DC converters regards the supplying of Central Processor Units (CPU) and Graphic Processor Units (GPU).

Modern processors are typically supplied with a switching DC-DC converter having a buck topology. Depending on the power consumption requirements, synchronous multiphase topologies may be employed. A multiphase topology is realized arranging N-single synchronous phase buck converters in parallel and controlling them with a same system control loop. The number of phase depends on the maximum current that the processor may drain, such as, two phases for maximum currents up to 40 A and eight phases for maximum currents up to 180 A.

Modern processors often require supply voltages having very stable values. For example, the maximum allowed deviation—caused by static accuracy, output voltage ripple, and drop due to heavy dynamic current transitions—may be equal to +/−5% (that is, for a supply voltage of 1 Volt, only +/−50 mV pp). The CPUs and GPUs of the latest generations have greatly increased their computational power; the current consumption (i.e., the amount of current drained in operation) of modern processors has changed from a "static" fashion to a "dynamic" fashion. More specifically, the current drained by modern processors may vary by a great extent based on the status of operation thereof with a high frequency (e.g., every microsecond). From an electrical point of view, modern processors may be modeled as current-pulse generators draining a current pulse train having a frequency repetition (Fl) up to 1 MHz with a high slew rate (e.g., up to 1000 A/μs).

The switching frequency (Fsw) of a standard switching DC-DC converter having the buck topology adapted to be exploited for supplying a processor is typically set (basically to increase the system efficiency) to a value ranging from approximately one to few hundreds of kHz.

The interference between the frequency repetition Fl of the current pulses drained by the load (the processor) and the switching frequency Fsw of the DC-DC converter may cause the generation of spurious beat oscillations (or frequency beats) at the (beat) frequencies of Fl−Fsw and Fl+Fsw (and multiples thereof). This phenomenon may negatively affect the correct operation of the converter, by, for example, introducing, in particular, low-frequency (Fl−Fsw) spurious oscillations in the current flowing through the reactive element (inductor) and in the output voltage generated by the converter. If sufficiently large, such spurious oscillations may cause the power components of the converters (such as the inductor and the switching elements) to be subjected to excessive electrical and thermal stresses and/or the value of the output voltage to exceed the maximum allowed deviation from the ideal value.

Figure 1:
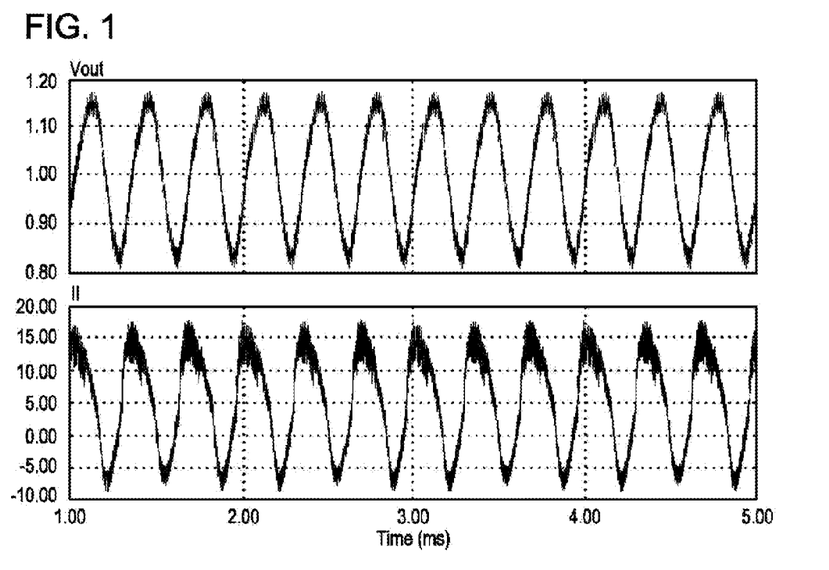
FIG. 1 illustrates an example of spurious beat oscillations affecting a DC-DC converter.

An example of such spurious beat oscillations is illustrated in the timing diagrams of FIG. 1, showing the simulated time course of the current flowing in the inductor (top) and of the output voltage (bottom) of an exemplary switching DC-DC buck converter operating at a switching frequency Fsw of 300 KHz for supplying a load draining a current pulse train having a frequency repetition Fl of 310 KHz (i.e., with a beat frequency of Fl−Fsw=10 kHZ).

In order to solve these and possibly other drawbacks, a first solution known in the art provides for using switching control units (i.e., the circuit that control the opening/closing of the switching elements of the converter) that exploit proper (typically, non-linear) techniques capable of eliminating the beat oscillations. However, switching control units of this type may be very complex and thus their cost may not be negligible.

A further known solution provides instead for using standard switching control units, but, at the same time, greatly reducing the bandwidth of the system for filtering out the beat oscillations. This solution may be very expensive, too. Indeed, a great bandwidth reduction slows the response time of the system; in order to restore the response time to comply with the output requirements, the output capacity needs to be increased, increasing thus the manufacturing cost.

SUMMARY

An embodiment provides for a voltage conversion unit. The voltage conversion unit comprises a switching DC-DC converter including an input terminal for receiving an input voltage from a source, a control terminal adapted to receive a pulse width modulated driving signal oscillating at a first frequency, and an output terminal for providing to a load an output voltage generated from the input voltage according to the driving signal. The voltage conversion unit further comprises a switching control unit configured to receive the output voltage and a reference voltage and to set a duty cycle of the driving signal based on a comparison between the output voltage and the reference voltage. The switching DC-DC converter and the switching control unit form a feedback loop having a loop gain defining a corresponding operating bandwidth of the voltage conversion unit. The load is configured to drain a current pulse train having a second frequency; the values of the first and second frequencies are such to cause the occurrence of beat oscillations at frequencies comprised within the operating bandwidth. The switching control unit comprises means for reducing the beat oscillations by increasing the loop gain at least for a frequency interval comprised within the operating bandwidth.

BRIEF DESCRIPTION OF THE DRAWINGS

One or more embodiments, as well as features and advantages thereof, will be best understood by reference to the following detailed description, given purely by way of a non-restrictive indication, to be read in conjunction with the accompanying drawings. In this respect, it is expressly intended that the figures are not necessarily drawn to scale and that, unless otherwise indicated, they are merely intended to conceptually illustrate the structures and procedures described herein. Particularly.

DETAILED DESCRIPTION

Figure 2:
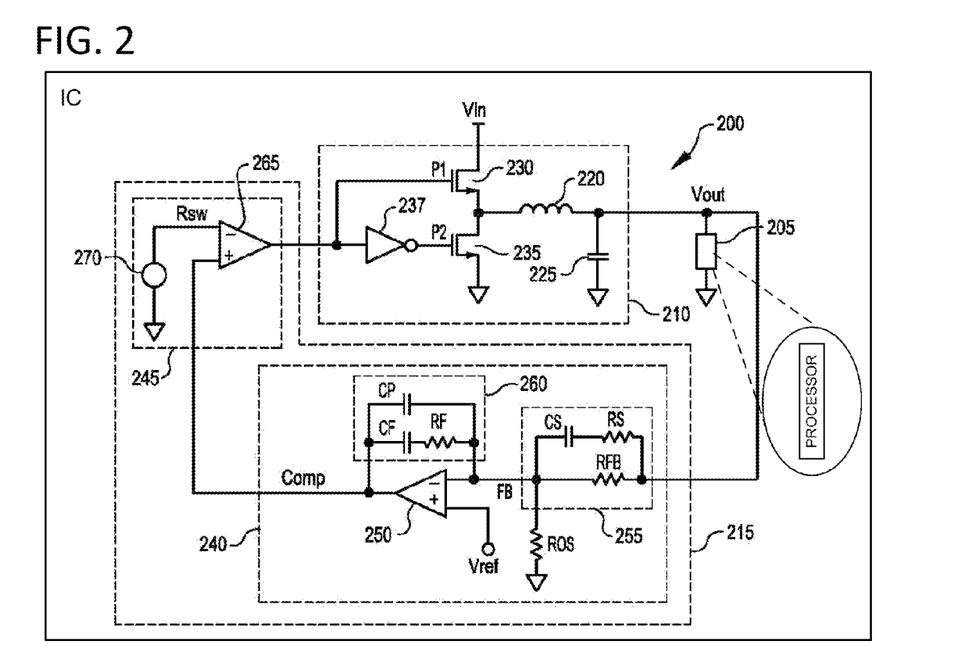
FIG. 2 illustrates a voltage conversion unit wherein an embodiment may be used.

With reference to the drawings, FIG. 2 illustrates an exemplificative scenario wherein an embodiment may be used.

Particularly, with the reference 200 it is indicated a voltage conversion unit, adapted to convert a (DC) input voltage Vin into a (DC) output voltage Vout having a different (lower) value to be provided to a load 205, schematized in figure by means of a block. For example, the voltage conversion unit 200 may be included in a computer; in this case, the input voltage Vin may be sourced by a computer supply circuit, and may have a value of, e.g., 12 Volts, while the load 205 is a processor—such as a Central Processor Units (CPU) or a Graphic Processor Units (GPU)—that requires a supply voltage Vout having a different value, such as 1 Volt.

The voltage conversion unit 200 includes two main sections, particularly a switching DC-DC converter 210 adapted to convert the input voltage Vin into the output voltage Vout, and a switching control unit 215 adapted to drive the DC-DC converter 210.

The DC-DC converter 210 illustrated in FIG. 2 is a converter having a buck topology, including an inductor 220, a capacitor 225, a main switch 230 and a secondary switch 235. Each switch 230, 235 is implemented with a transistor, for example an n-channel power MOS transistor having a first and a second transfer terminals and a control terminal. Particularly, the main switch 230 has the first transfer terminal coupled to the supply circuit (not shown in the figure) for receiving the input voltage Vin, the second transfer terminal coupled to the first transfer terminal of the secondary switch 235, and the control terminal coupled to the switching control system for receiving a driving signal P1, for example a digital Pulse Width Modulation (PWM) signal. The secondary switch 235 has the second transfer terminal coupled to a reference terminal for receiving a reference voltage (ground voltage), and the control terminal coupled to the switching control unit 215 for receiving a driving signal P2, for example a PWM signal that is a complementary version of the driving signal P1 generated from the latter through an inverter logic gate 237. The inductor 220 has a first terminal coupled to the second terminal of the switch 230 and to the first terminal of the switch 235, and a second terminal coupled to the load 205 for providing the output voltage Vout. The capacitor 225 has a first terminal coupled to the second terminal of the inductor 220, and a second terminal coupled to the reference terminal for receiving the ground voltage.

Before describing the switching control unit 215, the operation of the DC-DC converter 210 according to an embodiment will be now described.

As already anticipated in the introduction, the operation of a switching DC-DC converter of the buck type involves the execution of two phases, i.e., a main phase and a secondary phase, which are repeated in succession in a periodical way.

During the main phase, having a duration Ton, the inductor 220 is coupled to the source of the input voltage Vin—in this case, the supply circuit—by asserting the driving signal P1 (for example to the high logic value) and thus closing the main switch 230. During the main phase, the driving signal P2 is deasserted (for example, to the low logic value), and the secondary switch 235 is thus open. In this condition, the inductor 220 is crossed by a current Il that increases (in the direction shown in the figure, i.e., from the first to the second terminal of the inductor) with a slope that is substantially proportional to the potential difference developed across the terminals of the inductor 220—equal to the input voltage Vin minus the output voltage Vout—and that charges the capacitor 225. During the main phase a transfer of power from the supply circuit to the DC-DC converter 210 occurs, because the magnetic energy stored in the inductor 220 increases.

During the secondary phase, having a duration Toff, the driving signal P1 is deasserted, and thus the main switch 230 is opened; in the same way, the driving signal P2 is asserted, causing the closure of the secondary switch 235. In this condition, the inductor 220 is crossed by a current Il that decreases with a slope proportional to the voltage difference developed across the terminals of the inductor 220, in this case equal to the output voltage Vout. During the secondary phase, the capacitor 225 is discharged, the inductor is insulated from the source of the input voltage Vin, and a transfer of power from the inductor 220 to the load 205 occurs (the magnetic energy stored in the inductor decreases).

The ratio between the output voltage Vout and the value of the input voltage Vin is equal to the duty cycle D (expressed through a numeric value included in the interval [0,1]) of the driving signal P1. In other words, the value of the output voltage Vout may be increased by increasing the duty cycle D, i.e., by increasing the duration of the main phase, and decreased by decreasing the duty cycle D, i.e., decreasing the duration of the main phase.

The switching control unit 215 has the purpose of generating the driving signal P1 and P2, and particularly of generating the duty cycle D, in such a way to maintain the value of the output voltage Vout at the desired level, even in presence of variations in the current drained by the load 205.

The switching control unit 215 performs a feedback control on the output voltage Vout, comparing it with a reference voltage Vref, and generating the driving signal P1 with a duty cycle D which depends on the result of the comparison.

Particularly, the switching control unit 215 comprises a feedback unit 240 and a driving signal generator unit 245. The feedback unit 240 receives the output voltage Vout from the DC-DC converter 210 and accordingly generates a corresponding (analogical) comparison signal Comp whose amplitude is based on the difference between the reference voltage Vref and the output voltage Vout; moreover, in order to ensure stability to the feedback loop of the whole system, the feedback unit 240 is provided with a suitable compensation network. The driving signal generator unit 245 receives the comparison signal Comp generated from the feedback unit 240 and generates the driving signal P1 with a duty cycle D according to the amplitude of the comparison signal Comp.

The feedback unit 240 comprises an operational amplifier 250 and two passive networks 255, 260 (forming the compensation network). Specifically, a first passive network 255 has a first terminal coupled to the output of the DC-DC converter 210 for receiving the output voltage Vout and a second terminal coupled to the inverting input terminal of the amplifier 250 (circuit node FB); a second passive network 260 has a first terminal coupled to the circuit node FB and a second terminal coupled to the output terminal of the amplifier 250. The non-inverting terminal of the amplifier 250 receives the reference voltage Vref; the output terminal of the amplifier 250 provides the comparison signal Comp. A resistor ROS is coupled between the circuit node FB and a reference terminal receiving the ground voltage.

In FIG. 2 is detailed the circuit implementation of the passive networks 255, 260 according to a conventional technique. Particularly, the passive network 255 comprises a resistor RFB having a first terminal coupled to the output of the DC-DC converter 210 and a second terminal coupled to the circuit node FB; a resistor RS has a first terminal coupled to the first terminal of the resistor RFB and a second terminal coupled to a first terminal of a capacitor CS. The capacitor CS has a second terminal coupled to the output of the amplifier 250. The passive network 260 comprises a capacitor CP having a first terminal coupled to the circuit node FB and a second terminal coupled to the output terminal of the amplifier 250, and a resistor RF having a first terminal coupled to the circuit node FB and a second terminal coupled to a first terminal of a further capacitor CF. The capacitor CF has a second terminal coupled to the output terminal of the amplifier 250. The amplifier 250 senses and amplifies the difference between the output voltage Vout generated by the DC-DC converter 210 and the reference voltage Vref, with the passive networks 255, 260 that allow to correctly stabilize the feedback loop (as will be described later on). According to an alternative conventional technique (not illustrated in the figures), the passive network 255 is formed by the resistor RFB only.

FIG. 2 further illustrates a possible circuit implementation of the driving signal generator unit 245. Particularly, the driving signal generator unit 245 comprises a comparator 265 having a non inverting terminal coupled to the output terminal of the amplifier 250 of the feedback unit 240 for receiving the comparison signal Comp, an inverting terminal coupled to an oscillator circuit 270 for receiving a reference signal Rsw, and an output terminal for providing the driving signal P1 to the DC-DC converter 210. The reference signal Rsw is a sawtooth voltage signal having a constant frequency—referred to as switching frequency Fsw—equal to 1/(Ton+Toff); the reference signal Rsw increases its value, starting from the ground voltage, with a constant slope for the duration of the whole period, and that returns then to the ground voltage value in a rapid way at the end of each period. For example, the switching frequency Fsw may be equal to few hundreds of kHz, such as 300 kHz. As already mentioned above, the driving signal P1 outputted by the comparator 265 is a PWM signal, whose duty cycle DC is determined by the amplitude of the comparison signal Comp; indeed, the higher the amplitude of the comparison signal Comp, the higher the time employed by the reference signal Rsw (which increases with a constant slope for the duration of the whole period) for reaching the value of the comparison signal Comp during the period. As a consequence, the more the output voltage Vout is higher than the reference voltage Vref, the lower the duty cycle DC of the driving signal P1, and vice versa.

In this way, the main phase duration Ton is proportional to the duty cycle DC of the driving signal P1. Particularly, if the output voltage Vout was higher than the reference voltage Vref, the duty cycle DC of the driving signal P1 would decrease; therefore, in such case the output voltage Vout would be forced to diminish, because of the reduction of the main phase duration Ton. In an equivalent way, if the output voltage Vout was lower than the reference voltage Vref, the duty cycle DC of the driving signal P1 would increase; therefore, in such case the output voltage Vout would be forced to increase, because of the increase of the main phase duration Ton.

It is appreciated that in the system that has been described above, even if the duty cycle D is dynamically varied based on the output voltage Vout variations, the switches 230, 235 are always opened/closed at a constant switching frequency Fsw.

The components of the feedback unit 240 (and particularly those of the passive networks 255, 260) are suitably dimensioned in such a way to cause the feedback loop to be stable, and in such a way to properly limit the bandwidth of the system to a fraction of the switching frequency Fsw, such as Fsw/10.

Still referring to FIG. 2, although the voltage-conversion unit 200 is described as having a single-phase converter 210, the unit 200 may include a multi-phase converter, or may otherwise include multiple phases, and the feedback unit 240 (or other portions of the unit) may be modified accordingly.

Figure 3:
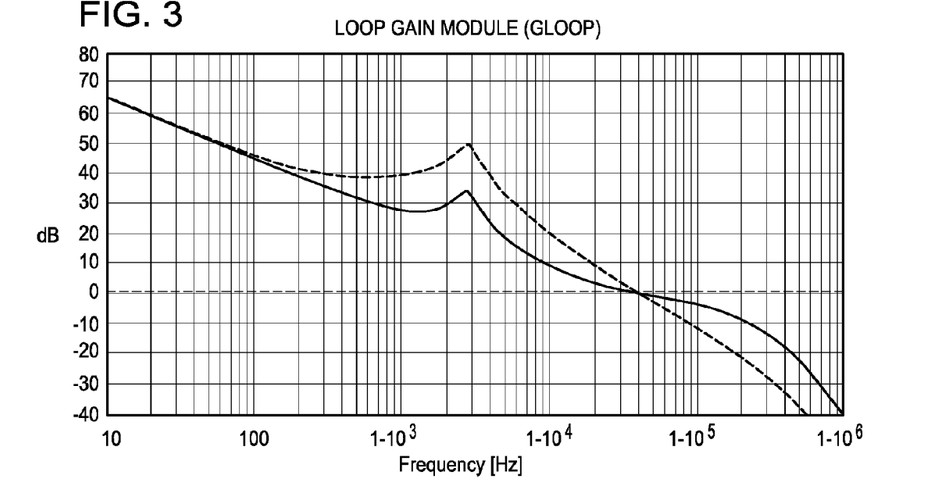
FIG. 3 shows a comparison between the loop gain of the voltage conversion unit of FIG. 2 and the loop gain of a voltage conversion unit according to an embodiment.

An example of a possible loop gain Gloop of the voltage conversion unit 200 described above and illustrated in FIG. 2 is shown in the Bode diagram of FIG. 3 (continuous line); in this exemplary case, the switching frequency Fsw is equal to 300 KHz, and the bandwidth of the system—i.e., the frequency interval wherein the loop gain Gloop is higher than 0 dB—is equal to about 30 KHz (i.e., a tenth of the switching frequency Fsw).

As already recited above, from an electric point of view the load 205 may be modeled as a current pulse generator which drains a train of current pulses with a frequency repetition Fl. If the load 205 is a modern CPU or GPU, the value of the frequency repetition Fl with respect to the value of the switching frequency Fsw may be such to cause the occurrence of spurious beat oscillations at frequencies—such as Fl−Fsw—comprised within the bandwidth of the system defined by the loop gain Gloop. For example, the frequency repetition Fl of a modern CPU may be equal to several hundreds of kHz.

In order to analyze the effects due to frequency beats in an electronic system provided with a feedback loop, it is convenient to study the loop gain of the system itself as if such frequency beats were not present, and then consider such frequency beats as noise additively injected into the system loop.

Figure 4:
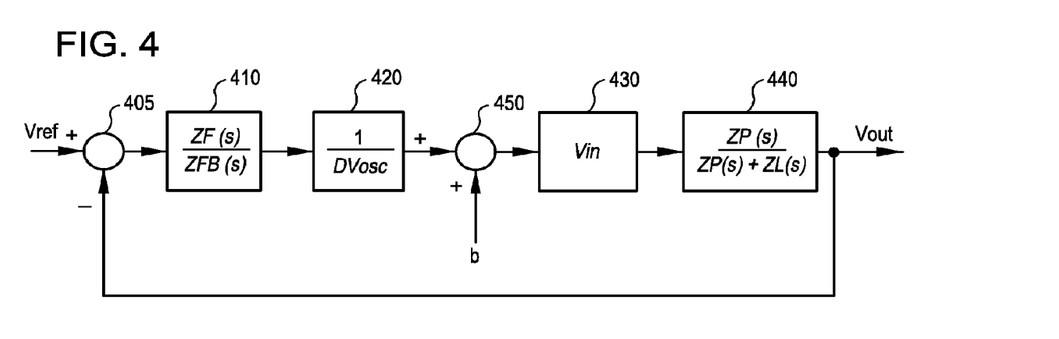
FIG. 4 illustrates a feedback loop model of the voltage conversion unit of FIG. 2.

For this purpose, the feedback loop of the voltage conversion unit 200 is modeled in FIG. 4 taking into considerations the transfer functions of the various units forming the voltage conversion unit 200, illustrated in figure by means of respective blocks.

Neglecting the presence of the frequency beats, the input of the system is the reference voltage Vref at the non-inverting input terminal of the amplifier 250, and the output is the output voltage Vout generated by the DC-DC converter 210. The feedback unit 240 is modeled by means of a subtraction node 405 receiving the reference voltage Vref and the output voltage Vout and providing the difference between the former and the latter to a block 410 whose transfer function is equal to ZF(s)/ZFB(s), wherein ZF(s) is the impedance of the passive network 260 and ZFB(s) is the impedance of the passive network 255. The driving signal generator unit 245 is modeled by means of a block 420 whose transfer function is equal to 1/DVosc, wherein DVosc is the gain of the driving signal generator unit 245 itself. The half bridge circuit formed by the switches 230, 235 of the DC-DC converter 210 is modeled by means of a block 430 whose transfer function is equal to Vin, wherein Vin is equal to the input voltage Vin. A last block 440 models the LC portion of the DC-DC converter 210 and the load 205; the transfer function of the block 440 is equal to Zp(s)/(Zp(s)+ZI(s)), wherein Zp(s) is the impedance of the parallel combination of the resistance of the load 205 and the capacitor 225 of the DC-DC converter, and ZI(s) is the impedance of the inductor 220. The blocks 410-440 are serially coupled to each other in a sequence, with the latter block 440 that outputs the output voltage Vout; the output voltage Vout is also provided back to the subtraction node 405 for being subtracted from the reference voltage Vref.

Therefore, the loop gain Gloop of the voltage conversion unit 200 may be expressed in the following way:

$$\text{Gloop}(s) = -\left(\frac{ZF(s)}{ZFB(s)}\right) \cdot \left(\frac{1}{DVosc}\right) \cdot (Vin) \cdot \left(\frac{Zp(s)}{Zp(s)+ZI(s)}\right). \quad (1)$$

In order to study the impact of frequency beats on the system above described, a frequency beat signal b is injected in the system loop as if it were a noise signal. Making reference in particular to FIG. 4, an addition unit 450 is inserted between the blocks 420 and 430 for allowing the frequency beat signal b to be injected into the loop after the block 420.

Considering equation (1), the gain G(s) between the frequency beat signal b and the output voltage Vout—illustrating how the frequency beats affect the output voltage Vout—may be expressed in the following way:

$$G(s) = \frac{Vout}{b} = \frac{K(s)}{1 - \text{Gloop}(s)}, \quad (2)$$

wherein K(s) is the (open loop) forward gain between the frequency beats signal b and the output voltage Vout, i.e.:

$$K(s) = (Vin) \cdot \left(\frac{Zp(s)}{Zp(s)+ZI(s)}\right). \quad (3)$$

According to an embodiment, the effects of the frequency beats on the voltage conversion unit 200 are reduced by lowering the gain G(s) between frequency beats and output voltage through a loop gain Gloop variation.

According to an embodiment, the gain G(s) is reduced by increasing the loop gain Gloop at least for a frequency interval within the bandwidth of the system, since the loop gain Gloop is at the denominator of the gain G(s) expression (see equation (2)). For the frequencies exceeding the bandwidth of the system, it is not necessary that the loop gain Gloop is increased, since at these high frequencies the open loop forward gain K(s) decreases (see equations (2) and (3)). In other words, according to an embodiment, the effects of the frequency beats on the voltage conversion unit are reduced by increasing the loop gain Gloop within the conversion unit's bandwidth; for higher frequencies, the beat oscillations are automatically filtered out by the conversion unit itself.

Observing equation (1), according to an embodiment, the loop gain Gloop may be increased by raising the ratio ZF(s)/ZFB(s), for example by increasing the impedance ZF(s) of the passive network 260 of the feedback unit 240.

Figure 5:
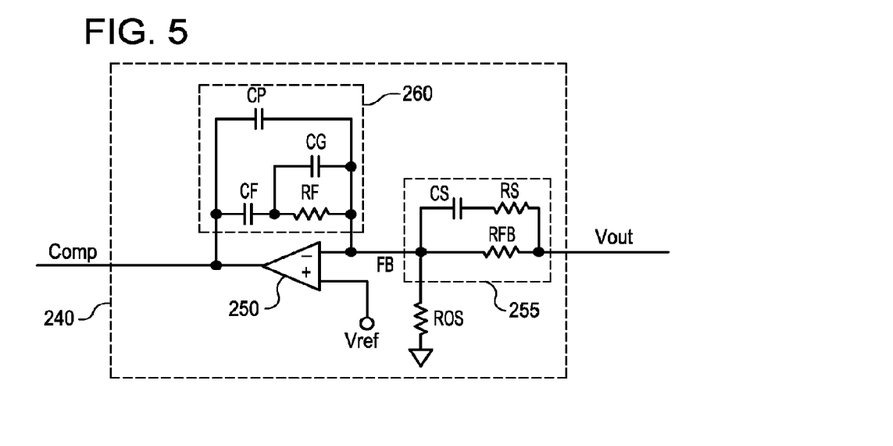
FIG. 5 illustrates a feedback unit of the voltage conversion unit of FIG. 2 modified according to an embodiment.
Figure 6:
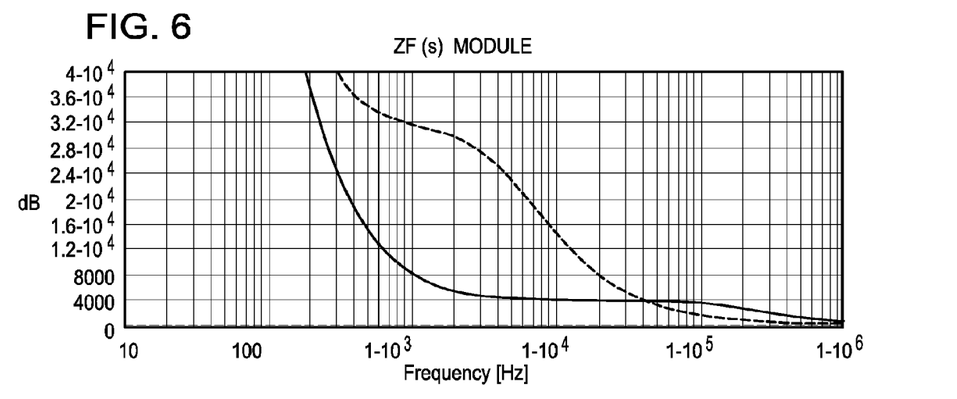
FIG. 6 shows an example of how the impedance of a network of the voltage conversion unit varies according to an embodiment.

According to an embodiment illustrated in FIG. 5, the impedance ZF(s) of the passive network 260 may be increased by introducing an additional capacitor CG in parallel with the resistor RF. FIG. 6 shows an example of how the impedance ZF(s) varies when the additional capacitor CG is added (dashed line). Compared with the case without the additional capacitor CG (continuous line), the impedance ZF(s) is higher for the frequencies within the bandwidth of the system (the frequencies lower than the reference BW depicted in figure). As expected, such impedance ZF(s) variation causes in turn an increase of the loop gain Gloop in a frequency interval within the bandwidth of the system, as shown in FIG. 3 with the dashed line. It is appreciated that, in this exemplary case, for the frequencies that exceed the bandwidth of the system, the loop gain Gloop is lower than that of the case without the additional capacitor CG; however, as already pointed out, this does not negatively affect the operation of the system, since at higher frequencies the open loop forward gain K(s) decreases. Referring to the dashed curve in FIG. 3, in an embodiment, the additional capacitor CG increases the magnitude of the slope at which the loop gain falls off in the vicinity of the unity-gain (0 dB) frequency. For example, the presence of CG may increase the magnitude of the loop gain's fall-off slope from about −20 dB per decade to about −40 dB per decade.

Figure 7:
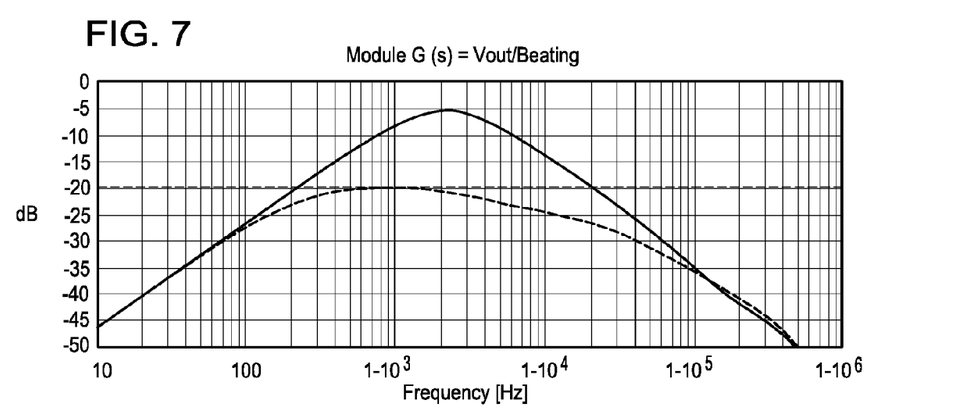
FIG. 7 illustrates how the gain between a frequency beat signal and the output voltage of the voltage conversion unit varies according to an embodiment.

FIG. 7 illustrates how the gain G(s) varies in the presence or not of the additional capacitor CG. In the example at issue, without the additional capacitor CG the gain G(s) has a maximum value of −5 dB (continuous line); when the additional capacitor CG is inserted in parallel with the resistor RF (dashed line), the gain G(s) has a lower maximum value—equal to −20 dB—and thus the output voltage Vout is less affected by frequency beats.

It is appreciated that the loop gain Gloop may be increased in other ways, for example by modifying the passive network 260 in another way to increase the impedance ZF(s) and/or modifying the passive network 255 to decrease the impedance ZFB(s). Similar considerations may apply even if the impedance ZBF(s) of the passive network 255 is different, such as even if it is formed by the resistor RFB only, without the resistor RS and the capacitor CS.

Compared to the known solutions, an embodiment may be simpler and less expensive, since it may require only minor modifications in the circuit, and since it may avoid at the same time any reduction in the loop bandwidth.

FIGS. 8A-8F are test bench comparisons between a standard technique (i.e., voltage conversion unit 200 having the passive network 260 of the feedback unit 240 lacking of the additional capacitor CG) and an embodiment (i.e., voltage conversion unit 200 having the passive network 260 of the feedback unit 240 provided with the additional capacitor CG). All these test comparisons have been carried out with the following parameters:

impedance of the inductor 220: 1 uH/0.7 mΩ;

capacitance of the capacitor 225: 3×820 uF/7 mΩ/2.2 nH+9×22 uF/5 mΩ/0.55 nH;

switching frequency Fsw of the switches 230, 235: 300 KHz, and current drained by the load 205: 1.5 to 9 A, Trise=Tfall=150 ns.

For the standard technique:
resistance of the resistor RF: 4.02 kΩ;
capacitance of the capacitor CF: 22 nF;
capacitance of the capacitor CP: 220 pF;
resistance of the resistor RS: 68Ω, and
capacitance of the capacitor CS: 15 nF.

For the embodiment:
resistance of the resistor RF: 30 kΩ;
capacitance of the capacitor CF: 22 nF;
capacitance as of the additional capacitor CG: 1 nF;
capacitance of the capacitor CP: 10 pF;
resistance of the resistor RS: 100Ω, and
capacitance of the capacitor CS: 15 nF.

Figure 8A:
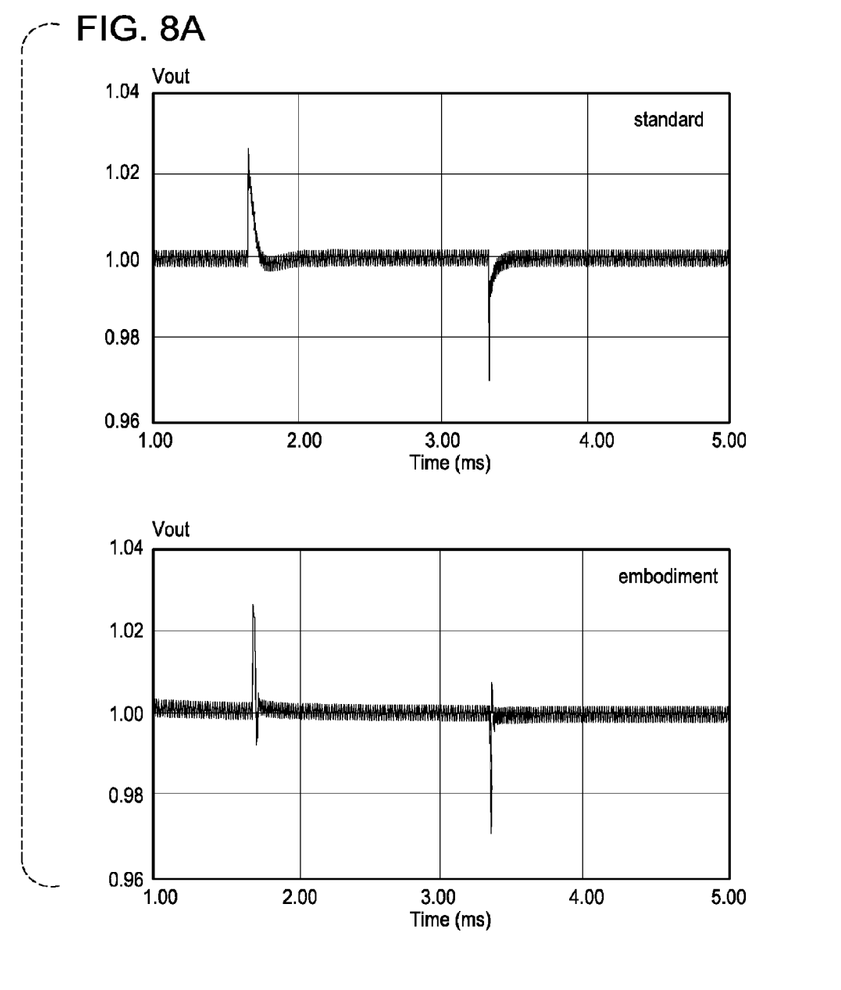
FIGS. 8A-8F are test bench comparisons between a standard voltage conversion technique and a voltage conversion unit according to an embodiment.
Figure 8B:
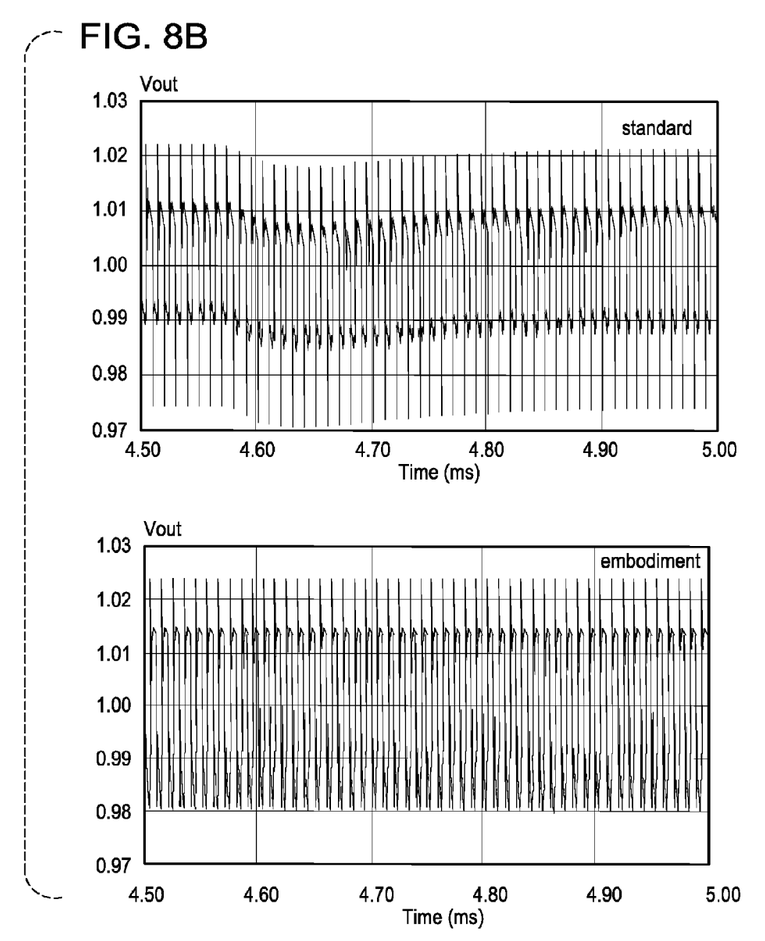
Figure 8C:
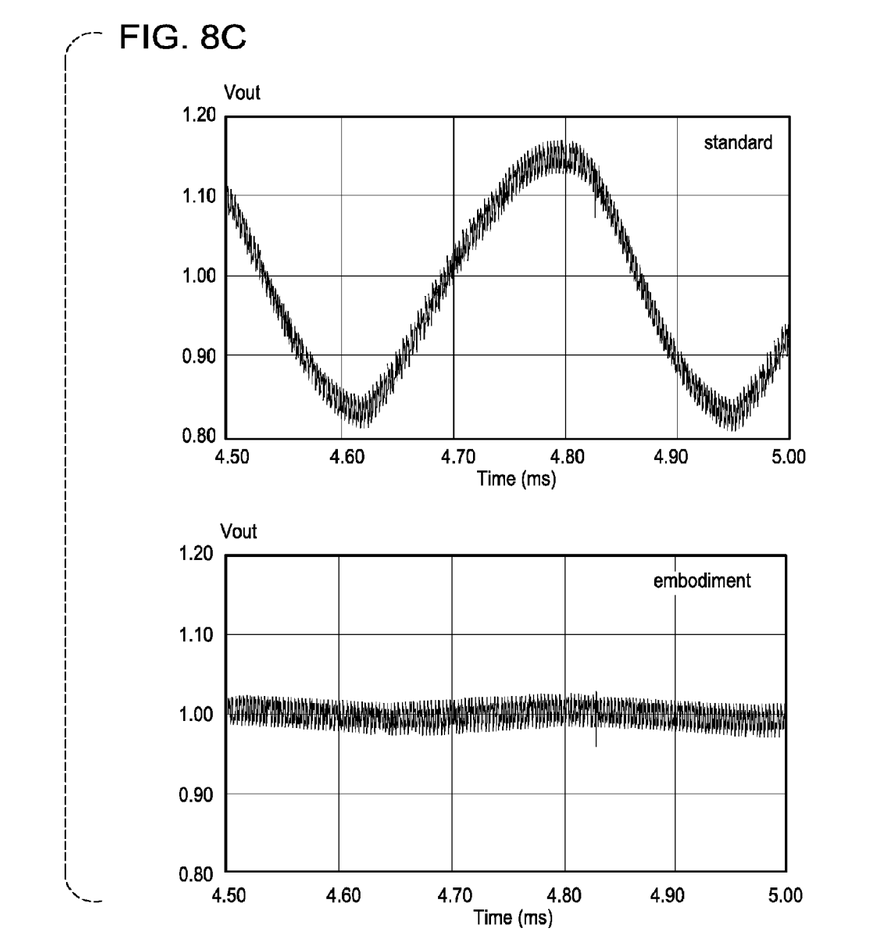
Figure 8D:
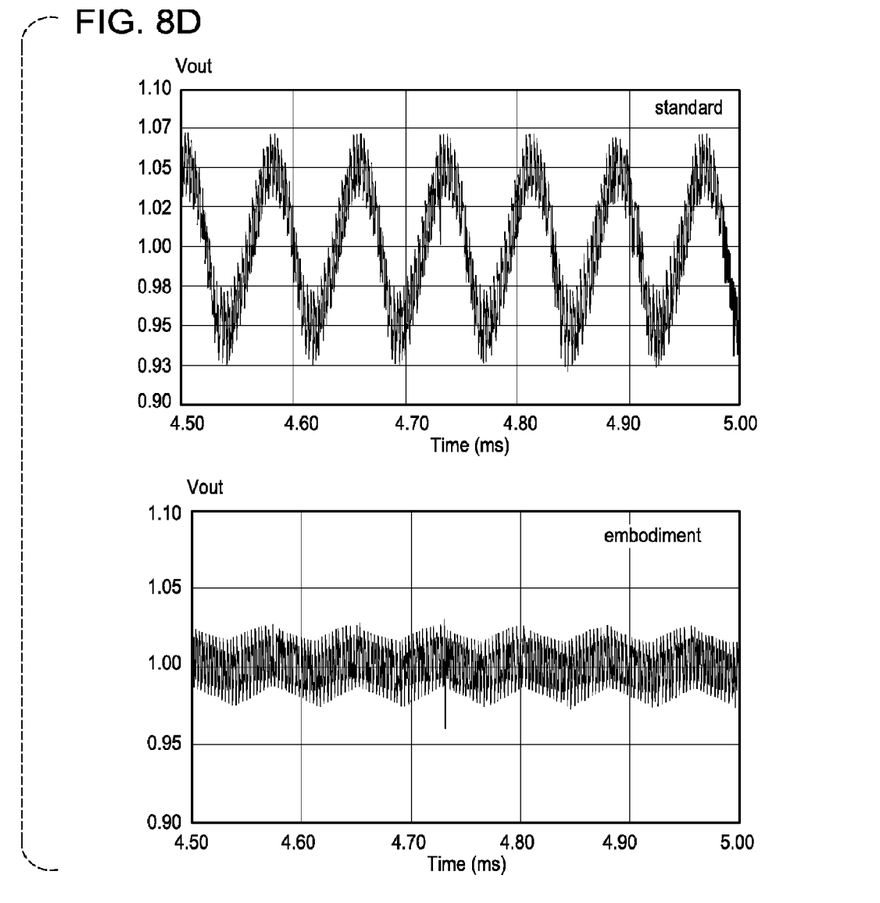
Figure 8E:
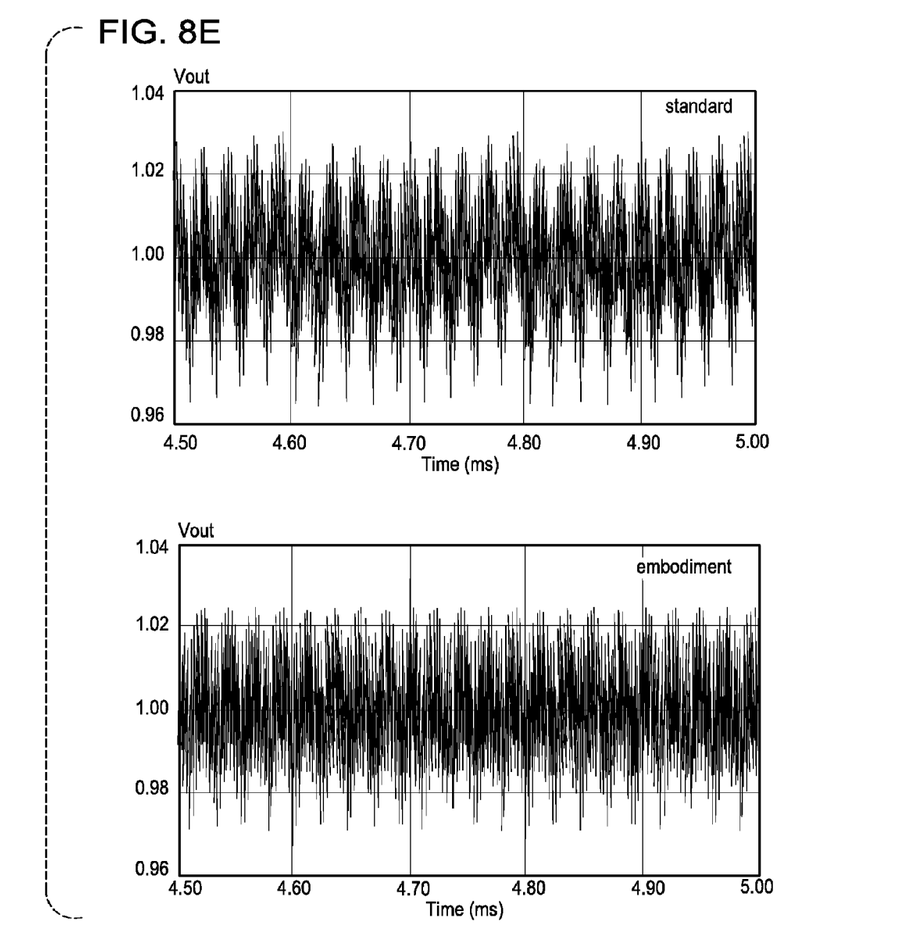

The frequency repetition Fl of the current pulses drained by the load 205 is set equal to:

300 Hz for the test bench comparison illustrated in FIG. 8A;

100 kHz for the test bench comparison illustrated in FIG. 8B;

300 kHz for the test bench comparison illustrated in FIG. 8C;

313 kHz for the test bench comparison illustrated in FIG. 8D;

345 kHz for the test bench comparison illustrated in FIG. 8E, and

Figure 8F:
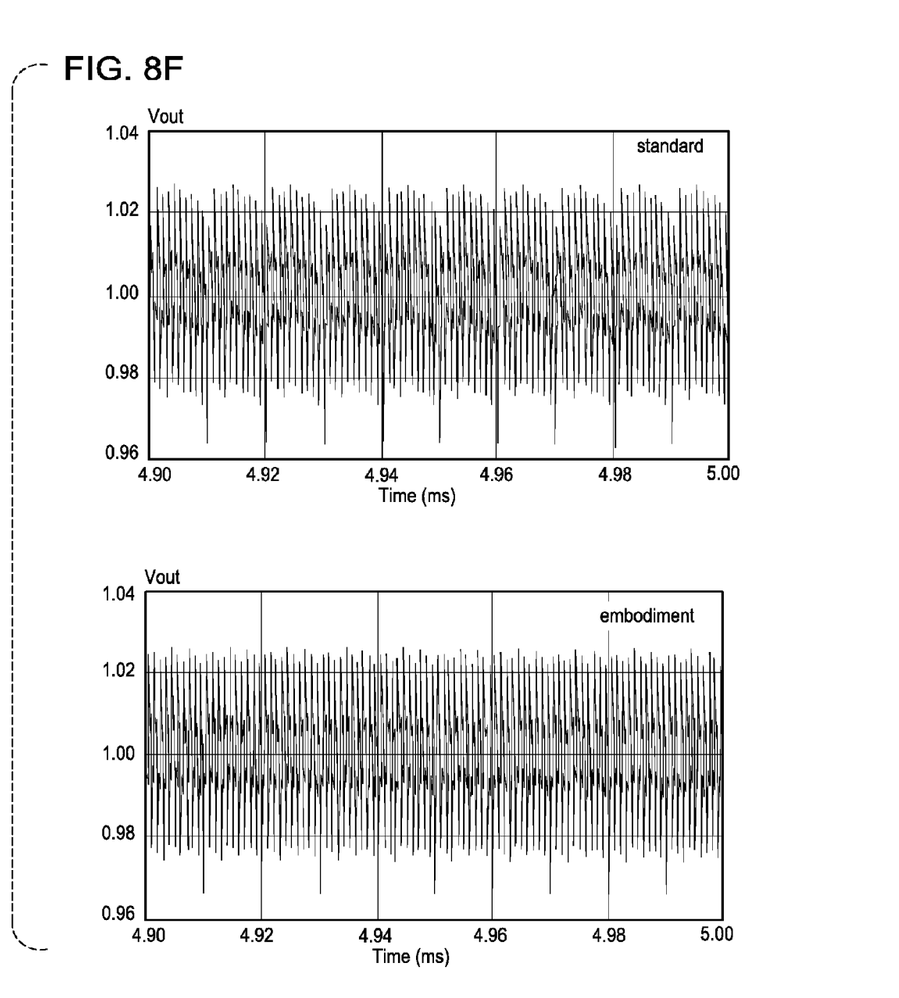

1 MHz for the test bench comparison illustrated in FIG. 8F.

It is appreciated that an embodiment has a further advantage with respect to the standard technique. Thanks to the loop gain Gloop increase within the loop bandwidth greater than 0 dB, the system is capable of reacting faster to possible load changes, by better recovering any output voltage drop due to such load changes.

Referring again to FIG. 2, the load 205 and the voltage conversion unit 200 as modified, for example, per FIG. 5, may be part of a system such as a computer system or handheld device such as a smart phone, where the load forms, e.g., a processor of the system. Alternatively, the unit 200 and load 205 themselves may form a system.

Furthermore, although an embodiment a buck converter is described above, the above-described compensation techniques may be applicable to other types of power supplies such as a buck-boost DC-DC converter.

Naturally, in order to satisfy local and specific requirements, a person skilled in the art may apply to the one or more embodiments described above many modifications and alterations. Particularly, although one or more embodiments have been described with a certain degree of particularity, it should be understood that various omissions, substitutions and changes in the form and details as well as other embodiments are possible; moreover, it is expressly intended that specific elements and/or method steps described in connection with any disclosed embodiment may be incorporated in any other embodiment as a general matter of design choice.

From the foregoing it will be appreciated that, although one or more specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A power supply, comprising:
an output node;
a circuit node configured to receive an interference signal having a first frequency;
a converter circuit configured to generate a regulated output signal at the output node and to switch at a second frequency; and
a feedback circuit coupled to the output node and to the converter circuit and configured to generate a compensation signal having a third frequency that is approximately equal to a difference between the first and second frequencies.

2. The power supply of claim 1 wherein the interference signal comprises a current signal.

3. The power supply of claim 1 wherein the interference signal comprises a load signal.

4. The power supply of claim 1 wherein the regulated output signal comprises a regulated output voltage.

5. The power supply of claim 1, further comprising:
an input node;
wherein the converter circuit comprises an inductor having a first node and having a second node coupled to the output node; and
wherein the converter circuit is configured to switch between coupling and uncoupling the first node of the inductor to the input node at the second frequency.

6. The power supply of claim 1, further comprising:
first and second input nodes;
wherein the converter circuit comprises an inductor having a first node and having a second node coupled to the output node; and
wherein the converter circuit is configured to alternately couple the first node of the inductor to the first and second input nodes at the second frequency.

7. The power supply of claim 1 wherein the first frequency is in a range of approximately 0-2 MHz.

8. The power supply of claim 1 wherein the second frequency is in a range of approximately 0-2 MHz.

9. The power supply of claim 1 wherein the third frequency is in a range of approximately 0-100 KHz.

10. The power supply of claim 1 wherein the converter circuit and feedback circuit form a loop having a unity-gain frequency that is approximately one tenth of the second frequency.

11. The power supply of claim 1 wherein:
the converter circuit and feedback circuit form a loop having a unity-gain frequency; and
the loop has a zero at a frequency that is less than the unity-gain frequency.

12. The power supply of claim 1 wherein:
the converter circuit and feedback circuit form a loop having a unity-gain frequency; and
the loop has two zeros at a frequency that is less than the unity-gain frequency.

13. The power supply of claim 1 wherein the converter circuit is configured to switch at a duty cycle that is related to the compensation signal.

14. The power supply of claim 1 wherein the output node and the circuit node comprise a same node.

15. The power supply of claim 1 wherein:
the converter circuit and feedback circuit form a loop having a unity-gain frequency; and the loop has two poles at a frequency that is less than the unity-gain frequency.

16. The power supply of claim 1 wherein the converter circuit comprises a single phase.

17. The power supply of claim 1 wherein the converter circuit comprises multiple phases.

18. A power supply, comprising:
an output node;
a circuit node configured to receive an interference signal having a first frequency;
a converter circuit configured to generate a regulated output signal at the output node and to switch at a second frequency; and
a feedback circuit coupled to the output node and to the converter circuit and configured to generate a compensation signal having a third frequency that is approximately equal to a difference between the first and second frequencies;
wherein the feedback circuit comprises:
an operational amplifier having an input node and an output node;
a first capacitor coupled between the input and output nodes;
a resistor and second capacitor serially coupled between the input and output nodes; and
a third capacitor coupled in electrical parallel with the resistor.

19. A system, comprising:
a power supply, including:
an output node;
a circuit node configured to receive an interference signal having a first frequency;
a converter circuit configured to generate a regulated output signal at the output node and to switch at a second frequency; and
a feedback circuit coupled to the output node and to the converter circuit and configured to generate a compensation signal having a third frequency that is approximately equal to a difference between the first and second frequencies; and
a load coupled to the output node.

20. The system of claim 19 wherein:
the output node and the circuit node comprise the same node; and
the load is configured to generate the interference signal at the output node.

21. The system of claim 19 wherein the load is configured to generate the interference signal by periodically changing a current that the load draws from the power supply.

22. The system of claim 19 wherein the load is configured to generate the interference signal by periodically changing a magnitude of a current that the load draws from the power supply.

23. The system of claim 19 wherein the load comprises an integrated circuit.

24. The system of claim 19 wherein the load comprises a processor.

25. The system of claim 19 wherein a portion of the power supply and the load are disposed on a same integrated-circuit die.

26. The system of claim 19 wherein a portion of the power supply and the load are disposed on different integrated-circuit dies.

27. A method, comprising:
generating a regulated output signal at an output node by coupling a first input signal to the output node at a first frequency and at a duty cycle;
receiving an interference signal having a second frequency; and
compensating the regulated output signal at a third frequency that is approximately equal to a difference between the first and second frequencies.

28. The method of claim 27 wherein the regulated output signal comprises a regulated output voltage.

29. The method of claim 27 wherein generating the regulated output signal comprises coupling the input signal to the output node via an inductor.

30. The method of claim 27 wherein generating the regulated output signal comprises alternately coupling the output node to the first input signal and to a second input signal.

31. The method of claim 27 wherein generating the regulated output signal comprises alternately coupling the output node to the first input signal and to ground.

32. The method of claim 27 wherein receiving the interference signal comprises receiving the interference signal at the output node.

33. The method of claim 27 wherein the interference signal comprises an interference current.

34. The method of claim 27, further comprising generating the interference signal with a load that is coupled to the output node.

35. The method of claim 27 wherein compensating the regulated output signal comprises varying the duty cycle at the third frequency.

* * * * *